Mar. 27, 1923.

U. F. CLEMONS.
APPARATUS FOR REFINING HYDROCARBON OILS.
FILED MAY 22, 1922.

1,449,734.

U. F. Clemons
INVENTOR.
BY John M. Spellman
ATTORNEY

Patented Mar. 27, 1923.

1,449,734

UNITED STATES PATENT OFFICE.

ULYSSES F. CLEMONS, OF MARSHALL, OKLAHOMA, ASSIGNOR OF ONE-HALF TO CHARLES F. O'NEALL, OF DALLAS, TEXAS.

APPARATUS FOR REFINING HYDROCARBON OILS.

Application filed May 22, 1922. Serial No. 562,699.

*To all whom it may concern:*

Be it known that I, ULYSSES F. CLEMONS, a citizen of the United States, residing at Marshall, in the county of Logan and State of Oklahoma, have invented certain new and useful Improvements in Apparatus for Refining Hydrocarbon Oils, of which the following is a specification.

This invention relates to a means and process for refining crude petroleum and hydrocarbon oils and in such connection it relates more particularly to the arrangement and construction of the parts thereof.

A particular feature and object of the invention is to provide a simple and efficacious means and apparatus wherein crude petroleum and hydrocarbon oils may be heated and the gases and vapors arising therefrom passed through a retarding, filtering and straining means and the fine and light product carried away for storage or to an engine, etc.

Another object of the invention lies in the manner of arranging and sustaining over the oil a bed of retarding and filtering material to permit the vapors and gases to be passed therethrough.

The invention will be better understood by reference to the following description, taken in connection with the accompanying drawing forming part hereof in which—

Figure 1:
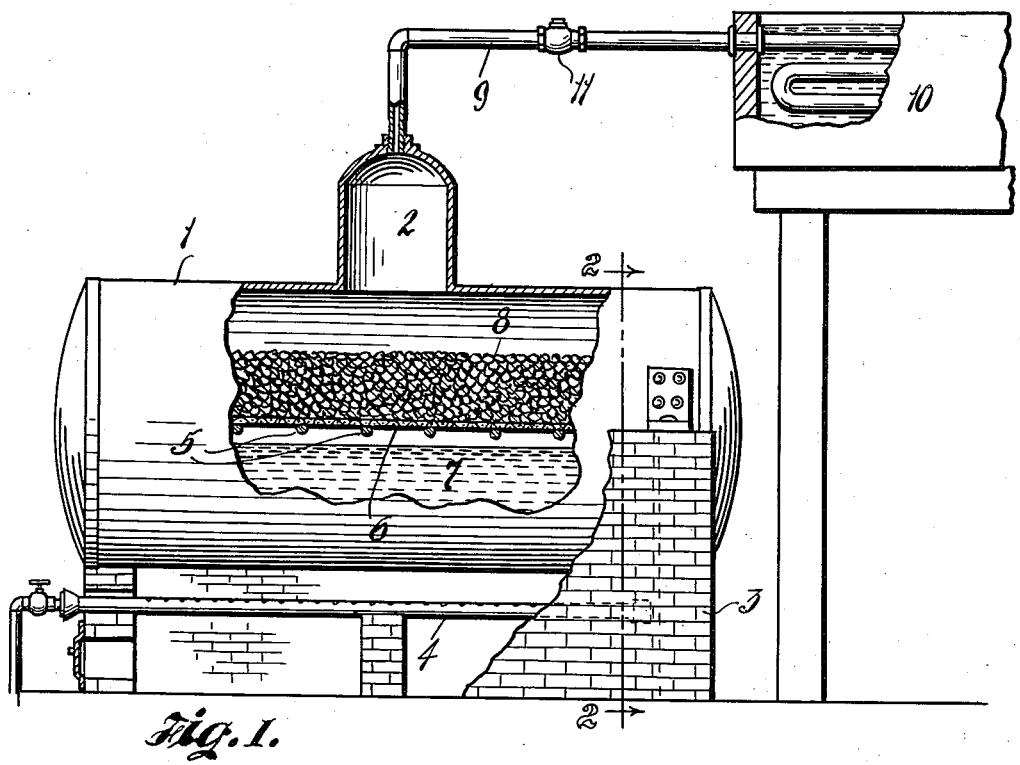
Figure 2:
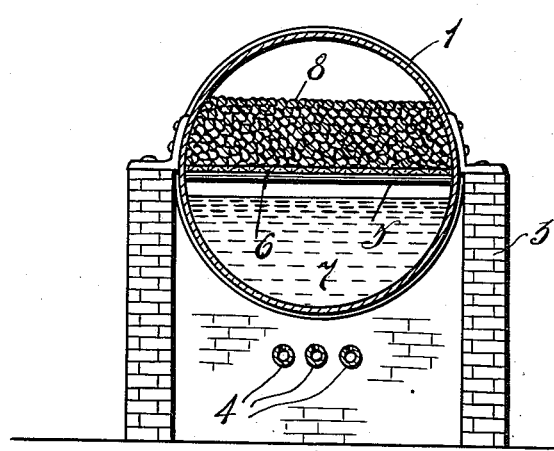

Figure 1 is a side elevational view of the invention, with part broken away for clearer illustration; and Figure 2 is a vertical sectional view, taken on line 2—2 of Figure 1.

Referring more in detail to the drawings, 1 denotes a tank closed at both ends and having a hollow dome 2.

The tank is supported upon fire brick forming a furnace 3 with feed pipes 4—4 comprising burners underneath the tank 1.

About midway between the top and bottom of the tank are a number of horizontal rods 5—5 spaced apart and of a length equal to the diameter of the tank to provide a support for a screen 6. These rods, however, may be welded to the sides of the tank or supported upon angle irons bolted to the walls of the tank, or similarly suspended, and are for the purpose of supporting a screen platform 6 of such size mesh or a sheet of metal with such suitably spaced perforations as to support a material such as fuller's earth, or similar soft clay, or any substance 8 which will absorb and retain undesirable and extraneous matter in the gases and vapors from the hydrocarbon oils in the process of elimination to obtain the refined product.

Connected to the dome 2 is a pipe 9 leading to a condenser 10 and between the dome 2 and condenser is a valve 11 which operates automatically to open and close at a predetermined pressure of vapor from the tank and dome through pipe 9.

In operation the fuller's earth or other material 8 will obstruct the passage of the heavier vapors arising from the petroleum 7 in the tank and permit only certain lighter and more volatile products to escape, which are further refined in passing through the material supported upon the screen 6.

What is claimed is—

An apparatus for refining crude petroleum and hydrocarbon oils, including a tank, heating means for the tank arranged therebelow, foraminous supporting means in and extending throughout the entire area of the tank arranged above the bottom in the vapor space thereof, a bed of fuller's earth of substantial depth arranged on said supporting means for retarding, filtering absorbing and eliminating extraneous matter from the petroleum vapors, a condenser, a connection between the tank and condenser and an automatic valve in said connection and being located between the tank and the condenser for operation upon a predetermined pressure of vapor being reached in the tank.

In testimony whereof I have signed my name to this specification.

ULYSSES F. CLEMONS.